United States Patent [19]
Sanchez et al.

[11] Patent Number: 6,086,415
[45] Date of Patent: Jul. 11, 2000

[54] HIGH DENSITY MODULAR PATCH PANEL

[75] Inventors: Albert L. Sanchez, Westerly; Robert C. Baxter, Jr.; James H. Wilcox, both of Warwick, all of R.I.

[73] Assignee: Hubbell Incorporated, Orange, Conn.

[21] Appl. No.: 09/181,822

[22] Filed: Oct. 29, 1998

[51] Int. Cl.[7] .............................. H01R 13/60; H01R 9/22
[52] U.S. Cl. ...................... 439/540.1; 439/532; 439/719
[58] Field of Search ................................. 439/540.1, 501, 439/532, 709, 713, 719

[56] References Cited

U.S. PATENT DOCUMENTS

| | | | |
|---|---|---|---|
| 4,669,799 | 6/1987 | Vachhani et al. | 439/404 |
| 5,055,067 | 10/1991 | Field | 439/540.1 |

OTHER PUBLICATIONS

Full Line Catalog #1100R, New Edition, Hubbell Premise Wiring, Inc. Jun. 1993.

*Primary Examiner*—Paula Bradley
*Assistant Examiner*—Edwin A. León
*Attorney, Agent, or Firm*—Roylance, Abrams, Berdo & Goodman, L.L.P.

[57] ABSTRACT

A patch panel supports a plurality of energy transmission connectors, and includes a jack holder, a front panel and a cable tray. The jack holder has a plurality of openings in which the connectors can be mounted and has a vertical member and a horizontal member extending at a angle to the vertical member. The vertical member has upper and lower engagement members extending from a surface of the vertical member remote from the horizontal member. The front panel has a vertical section with openings and with upper and lower, rearwardly extending engagement flanges defining a channel between them. The jack holder is mounted in the channel with the engagement members engaging the engagement flanges. The openings of the front panel are aligned with the openings in the jack holder. The cable tray is coupled to and extends forwardly from the vertical section of the front panel.

21 Claims, 6 Drawing Sheets

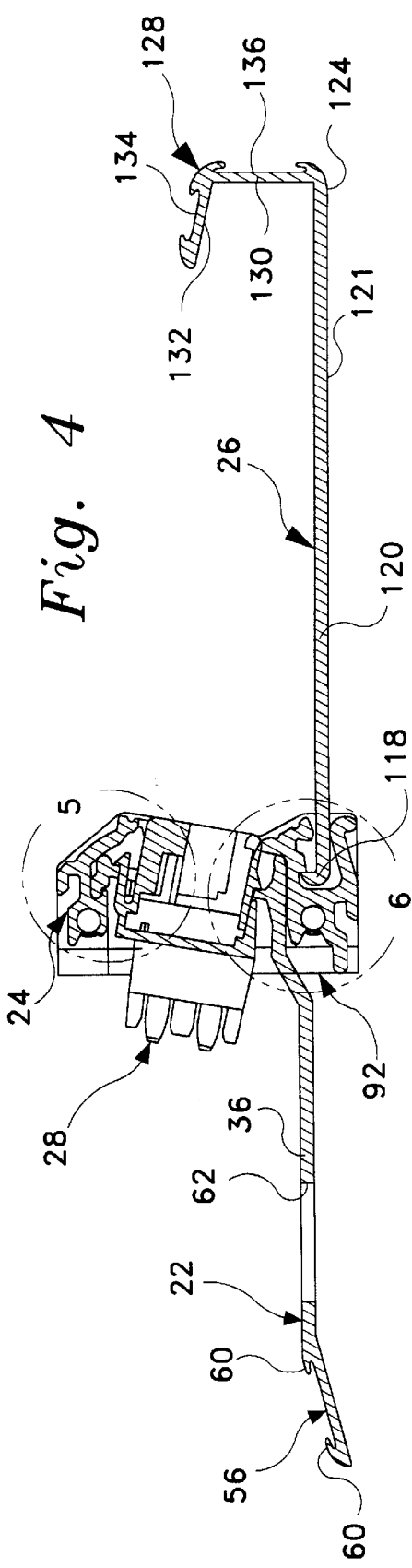
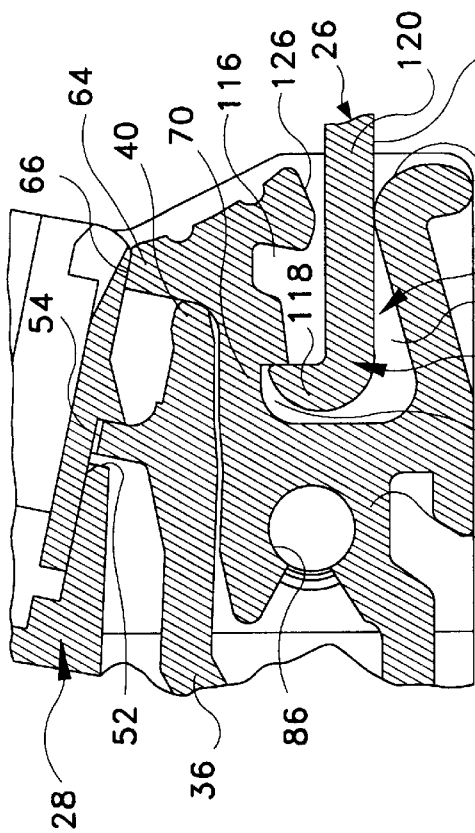
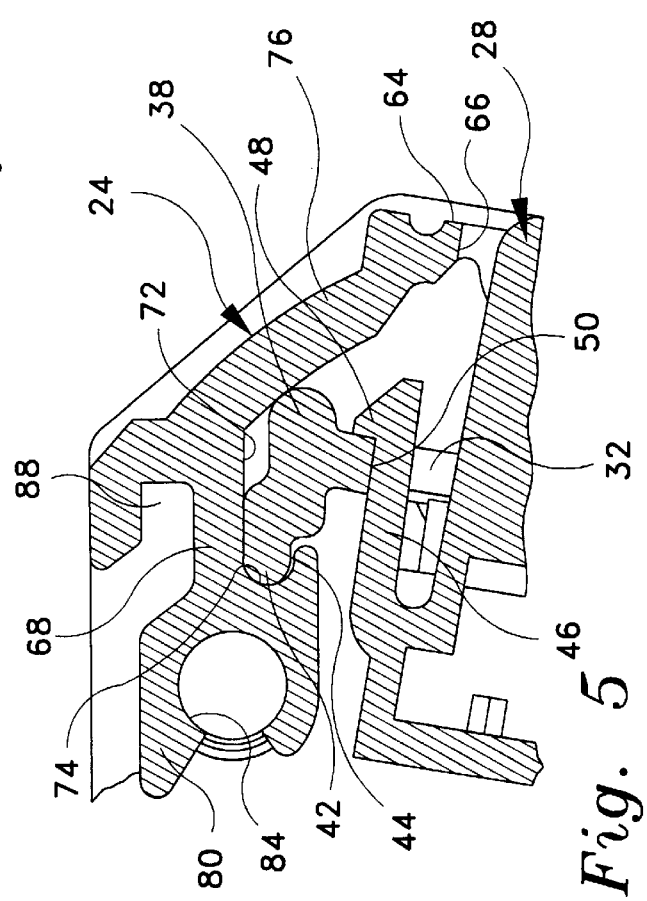

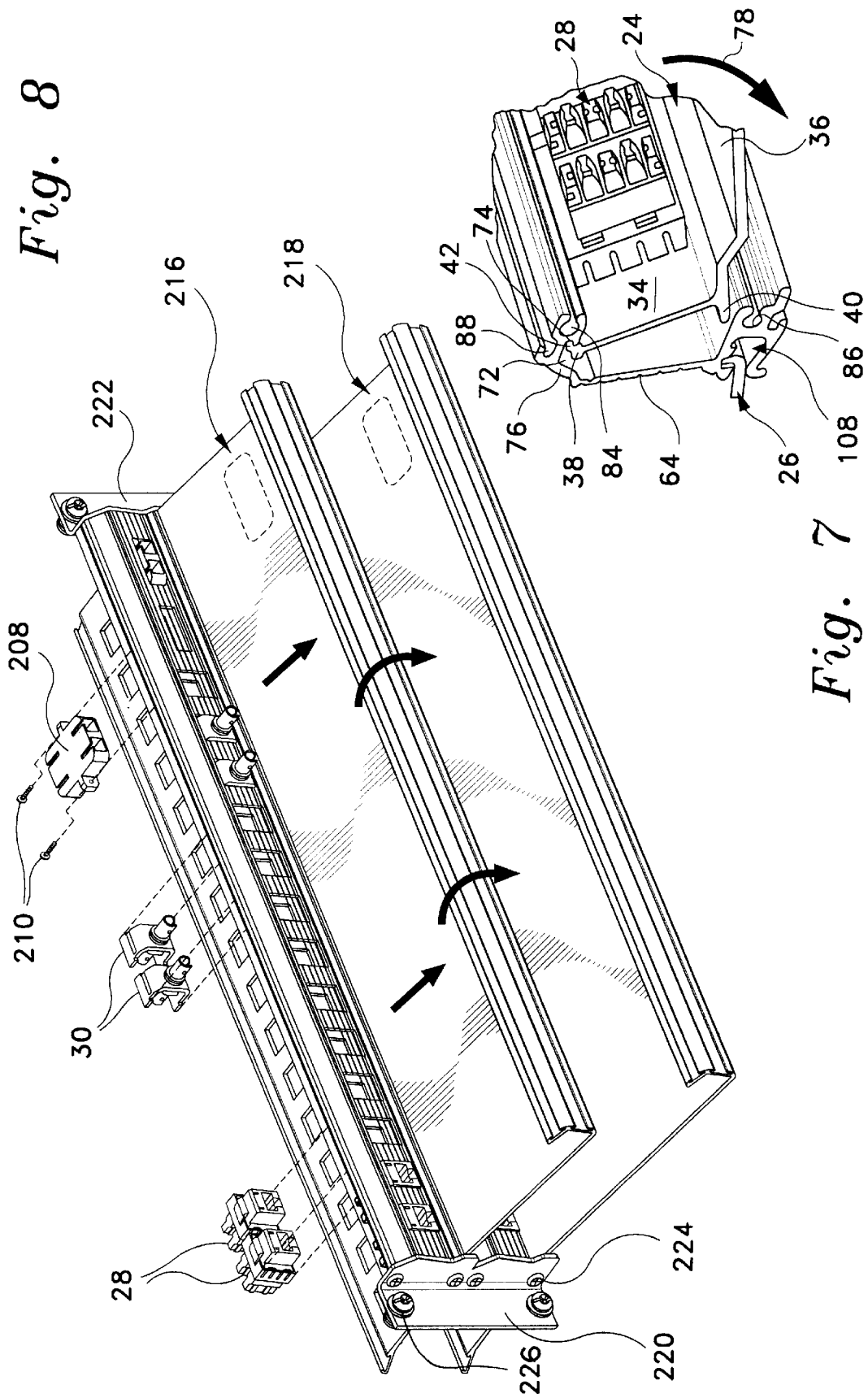

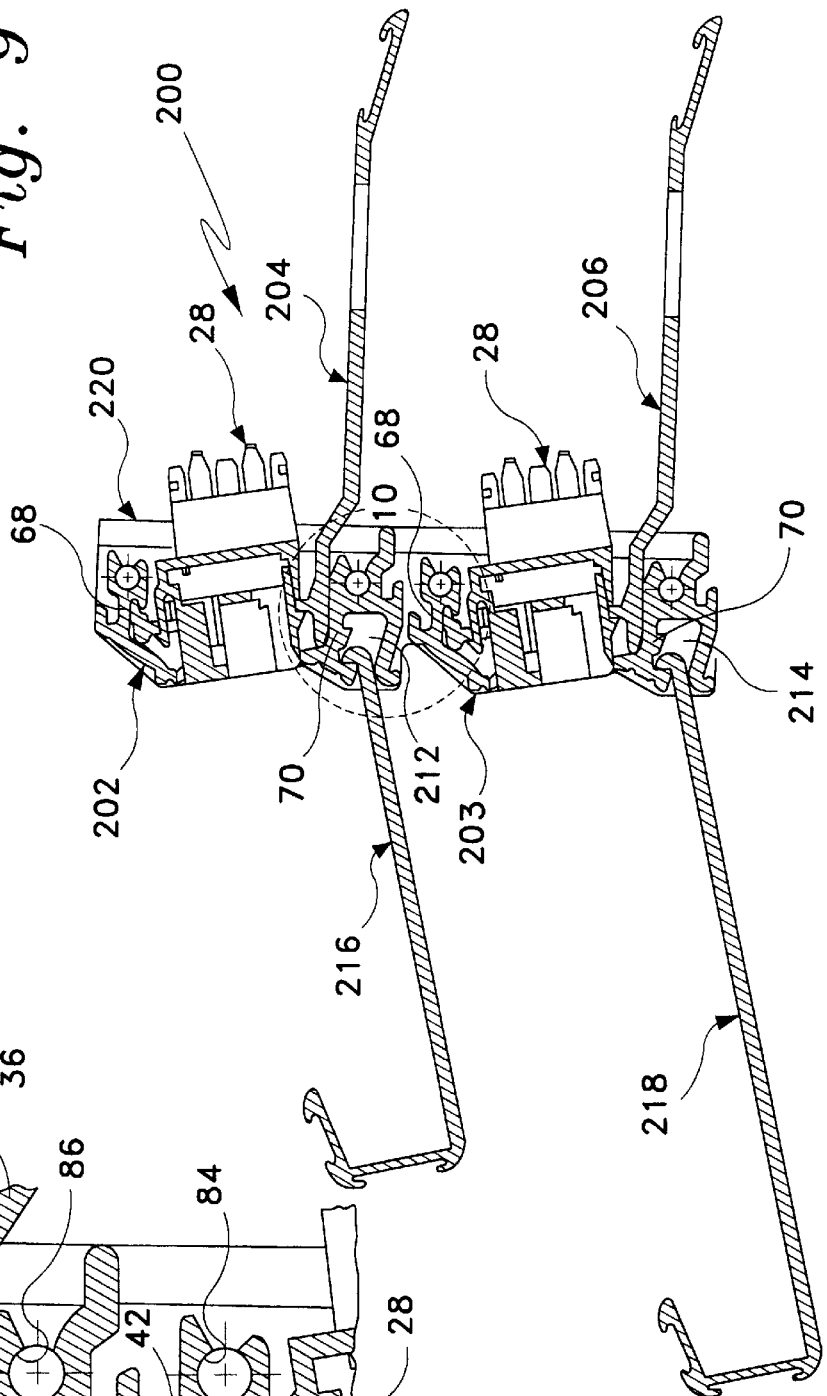
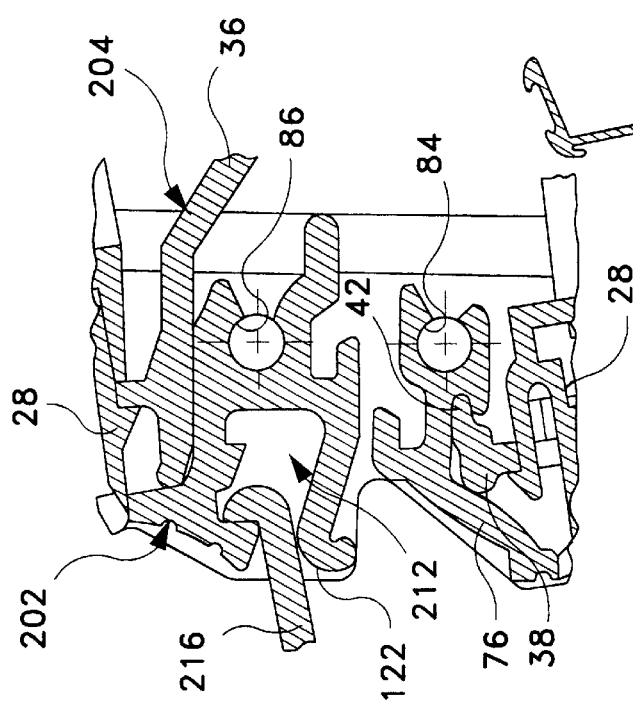

HIGH DENSITY MODULAR PATCH PANEL

BACKGROUND OF THE INVENTION

Patch panels provide a centralized point for cross connecting voice and/or data lines. Patch panels include a plurality of energy transmission connectors, i.e., electrical connectors and/or fiber optic cable connectors.

Modern complex telecommunication systems use different types of cables and media. Thus, the patch panel employed in such systems must be adapted to receive and support connectors of a multi-media type.

Further, each connector must be appropriately and clearly labeled to facilitate the proper connection. The labeling must be easily visible despite the presence of numerous cables which tend to obscure the labels provided on or immediately adjacent directly on the connectors.

High density is required to allow the maximum quantity of connectors in a limited rack or closet space. Relatively large numbers of connectors and cables or patch cords within a limited space requires efficient use of the space without undue complexity and without undue restriction on the ability to make and break the connections. When individual conductors are to be coupled to the insulation displacement contacts on the jacks or connectors, the limited space available when the patch panels are mounted in a rack makes the installation difficult.

SUMMARY OF THE INVENTION

An object of the present invention is to provide a patch panel that allows pre-loading or pre-connection of the conductors to the connector terminals of the patch panel prior to mounting on the rack to facilitate the connection of the conductors to the terminals in a more convenient, accessible and less crowded location.

Another object of the present invention is to provide a patch panel having its labels supported at distances spaced from the connector such that labels are clearly visible when the panel is fully populated and terminated.

A further object of the present invention is to provide a patch panel that conserves and optimizes the use of space for the various patch cords during installation and facilitates access to the plugs for making and breaking connections.

Yet another object of the present invention is to provide a patch panel constructed for adaptation to future requirements and for upgrades, particularly for shielding.

A yet further object of the present invention is to provide a patch panel which is adaptable to different types of jacks and adapters and increased port density, is aesthetic, is able to accommodate a wide variety of labels and has an effective cable or cord management system for the cables or cords connected to the connectors on the patch panel.

The foregoing objects are basically obtained by a patch panel for supporting a plurality of energy transmission connectors, comprising a jack holder, a front panel, and a cable tray. The jack holder has a plurality of openings in which the connectors can be mounted, and has a vertical member and a horizontal member extending at a angle to the vertical member. The vertical member has upper and lower engagement members extending from a surface of the vertical member remote from the horizontal member. The front panel has a vertical section with openings and with upper and lower rearwardly extending engagement flanges defining a channel therebetween. The jack holder is mounted in the channel with the engagement members engaging the engagement flanges. The openings of the front panel are aligned with the respective openings in the jack panel. The cable tray is coupled to and extends forwardly from the vertical section of the front panel. This cable tray has a base portion.

By forming the patch panel in this manner, the appropriate conductors can be connected to the terminals on the connectors while the connectors are solely mounted on the jack holder and while the jack holder is separated from the front panel. With the jack holder separated from the front panel, the connection can be made in a convenient location separated from the crowded rack to facilitate quick and proper conductor termination. After all the appropriate conductors are connected to the terminals on the various connectors on an individual jack holder, the jack holder can then be easily mounted or attached to the front panel which may or may not have been previously mounted in a rack.

The cable tray, in extending forwardly from the front panel, optimizes cable management without occupying space on the rack, thereby conserving and optimizing installation space. This construction is adaptable for shielding, as may be required by future requirements, and can receive a number of different types of connectors and adaptors with increased density and with an aesthetic appearance. Numerous different types of labeling can also be used. Further, the arrangement permits the connectors to be sloped forwardly and downwardly to reduce the degree of bending necessary for the cable or cords coupled to the connectors.

Other objects, advantages and salient features of the present invention will become apparent from the following detailed description, which, taken in conjunction with the annexed drawings, discloses preferred embodiments of the present invention.

As used in this application the terms "front", "back", "upper", "lower", "side", "end", "top", and "bottom" are intended to facilitate the description of the patch panel. Thus, such terms are merely illustrative of the patch panel and are not intended to limit it to any specific orientation.

BRIEF DESCRIPTION OF THE DRAWINGS

Referring to the drawings which form a part of this disclosure:

FIG. 4 is a side elevational view in section of the patch panel of FIG. 1;

FIG. 5 is a partial, enlarged, side elevational view in section of detail 5 of FIG. 4;

FIG. 6 is a partial, enlarged, side elevational view in section of detail 6 of FIG. 4;

FIG. 7 is a partial, perspective view of the patch panel of FIG. 1 showing the coupling procedure of the jack holder and the front panel;

FIG. 8 is a generally front, perspective view, with portions exploded, of a patch panel according to a second embodiment of the present invention;

FIG. 9 is a side elevational view in section of the patch panel of FIG. 8; and

FIG. 10 is a partial, enlarged, side elevational view of detail 10 of FIG. 9.

DETAILED DESCRIPTION OF THE PREFERRED EMBODIMENTS

Figure 1:
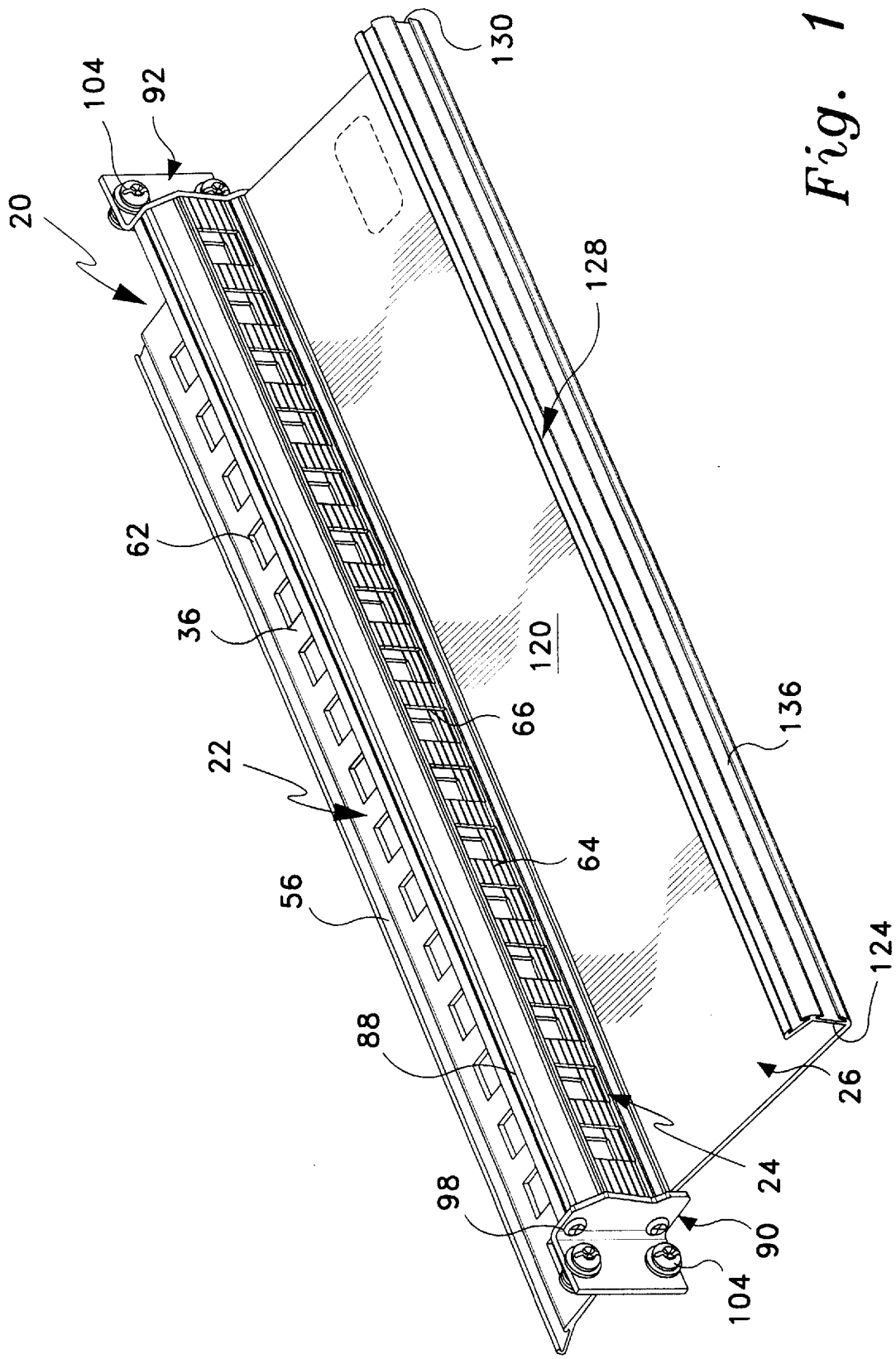
FIG. 1 is a generally front, perspective view of a patch panel according to a first embodiment of the present invention, without the connectors being mounted therein.

Referring initially to FIGS. 1–7, a high density, modular patch panel 20 adaptable to support several different media simultaneously at a single rack position, according to a first embodiment of the present invention, is illustrated. Patch panel 20 comprises a jack holder 22, a front panel 24 and a cable tray 26. The jack holder mounts a plurality of energy transmission connectors in the form of electrical and fiber optic connectors. The jack holder with the connectors thereon is coupled to the front panel such that the connectors extent through the front panel. The cable tray is coupled to and extends forwardly from the front panel for cable management purposes.

Jack holder 22 is adapted for mounting electrical or telecommunications jacks 28 and/or other energy transmission connectors 30 of a different media type. The energy transmitted can be electrical or optical. These connectors are received within openings 32 in a vertical member 34. A horizontal member 36 is formed unitarily, as a single piece of extruded aluminum, with vertical member 34, and extends at a substantially right angle to the vertical member. In cross section, jack holder 22 is substantially L-shaped.

An upper engagement member 38 extends along the top longitudinal edge of vertical number 34, while a lower engagement member 40 extends along a lower longitudinal edge of the vertical member. Both engagement members extend forwardly from the vertical member, i.e., from a front surface of the vertical member, remote from horizontal member 36. The upper engagement member also includes rearwardly extending projection 42 with an undercut portion 44.

Openings 32 in vertical member 34 of jack holder 22 are rectangular in configuration. The dimensions of each opening are set to mate with conventional latching mechanisms on connectors 28 and 30. As best illustrated in FIG. 5, connector 28 has a resilient latch arm 46 with an abutment 48. Latch arm 46 extends through opening 32, with a upper surface of the latch arm engaging an upper edge 50 of the respective opening 32. Abutment 48 engages the front surface of vertical member 34 immediately above the opening.

As best illustrated in FIG. 6, the lower surface of connector 28 is provided with a laterally outwardly opening recess 52 extending transverse to the axial direction of the connector. Recess 52 engages and receives the lower edge 54 of the respective opening 32. The engagements of latch arm 46 and recess 52 with the upper and lower edges 50 and 54 of the respective opening 32 positively retain and mount each connector within an opening 32 of jack holder 22. Connector 30 can be mounted and coupled in a similar manner.

A label support 56 is provided at the end of horizontal member 36 remote from vertical member 34. The label support has a base oriented at a slight angle downwardly and outwardly from horizontal member 36. Two retaining flanges 60 extend from opposite sides of the base member to provide an undercut groove for receiving and retaining the labels. By locating the label support remote from the connectors, the labels will not be obscured by the connectors or the wiring or cables coupled thereto.

Horizontal member 36 is also provided with a series of a rectangular openings 62 located between the vertical member and the label support. Each opening 62 is aligned with one of the openings 32 in vertical member 34. The openings can be used for supporting other connectors or feeding through cables.

Front panel 24 is formed unitarily as a single piece of extruded aluminum, and includes a vertical section 64 with a plurality of rectangular openings 66. Openings 66 are similar in number and spacing to openings 32 in jack holder vertical member 34, for receiving forward portions of connectors 28 and 30 which can extend therethrough.

Vertical section 64 has an upper engagement flange 68 and a lower engagement flange 70. The details of the configurations of the upper and lower engagement flanges 68 and 70 is best illustrated in FIGS. 5 and 6, respectively.

Upper engagement flange 68 has a downwardly opening recess 72 with a groove 74 opening forwardly into the recess. Recess 72 and its groove 74 are configured and dimensioned to mate with upper engagement member 38 and its rearwardly extending projection 42. Engagement member 38 and projection 42 are positively retained within recess 72 and groove 74, with the forward end of upper engagement member 38 engaging a rearward surface of a upwardly slanting portion 76 of vertical section 64, when the jack holder and front panel are fully coupled.

The upper surface of front panel lower engagement flange 70 and the lower surface of jack holder lower engagement member 40 have a series of mirror image alternating hills and valleys or male or female detents with sloping surfaces which allow a respective hills or male detents to engage the respective valleys or female detents when the jack holder and front panel are engaged.

Jack holder 22 and front panel 24 are coupled according to the procedure illustrated in FIG. 7. Initially, the jack holder, with the connectors mounted thereon, has its upper engagement member 38 located within recess 72, particularly with projection 42 engaged within groove 74, but with the forward end of the upper engagement member 38 spaced from slanting portion 76. In this canted position of the jack holder relative to the front panel, lower engagement member 38 is angularly oriented relative to and spaced from lower engagement flange 70. With the jack holder and front panel in this canted orientation, illustrated in FIG. 7, the jack holder is pivoted about projection 42 along the arc depicted by directional arrow 78 until jack holder and front panel are fully coupled, with upper engagement member 38 contacting the inner surface of slanting portion 76 and lower engagement member 40 engaging the inner surface of vertical section 64 below openings 66.

Upper and lower engagement flanges 68 and 70 have large end sections 80 and 82, respectively, located remote from vertical section 64. End section 80 has a cylindrical bore 84. End section 82 has a cylindrical bore 86. Bores 84 and 66 are laterally open over an accurate section thereof remote from vertical section 64.

The upper end of the front panel, i.e., the upper surface of upper engagement flange 68, is provided with an undercut recess 88. Recess 88 opens upwardly and can be used for mounting accessories on the front panel without interfering with its coupling to a rack or to the jack holder.

Brackets 90 and 92 are coupled to the opposite longitudinal ends of front panel 24. Each bracket comprises an L-shaped member with a first leg 94 overlying one longitudinal end of the front panel. First leg 94 includes two vertically spaced bores 96 which receive mounting screws 98. Mounting screws 98 pass through bores 96 and are threatedly engaged within bores 84 and 86 in front panel 24 to couple each bracket to the front panel. The second leg 100 of each L-shaped bracket 90 and 92 has elongated openings 102, and extends substantially perpendicularly to the first leg. Openings 102 receive mounting screws 104 which are backed by washers 106. Mounting screws 104 are used to mount patch panel 20 to a conventional rack for patch panels according to conventional practices.

Cable tray 26 is coupled to the front panel by an elongated slot 108 formed in the lower end of the front panel and opening on a front surface of the front panel. The slot receives an elongated attachment edge portion 110 of cable tray 26. Slot 108 includes a main channel 112, and first and second elongated locking channels 114 and 116. The locking channels are located inside the slot and open into locking channel 112. First locking channel 114 is located at a greater distance from the front surface of front panel 24 than is second locking channel 116.

Figure 2:
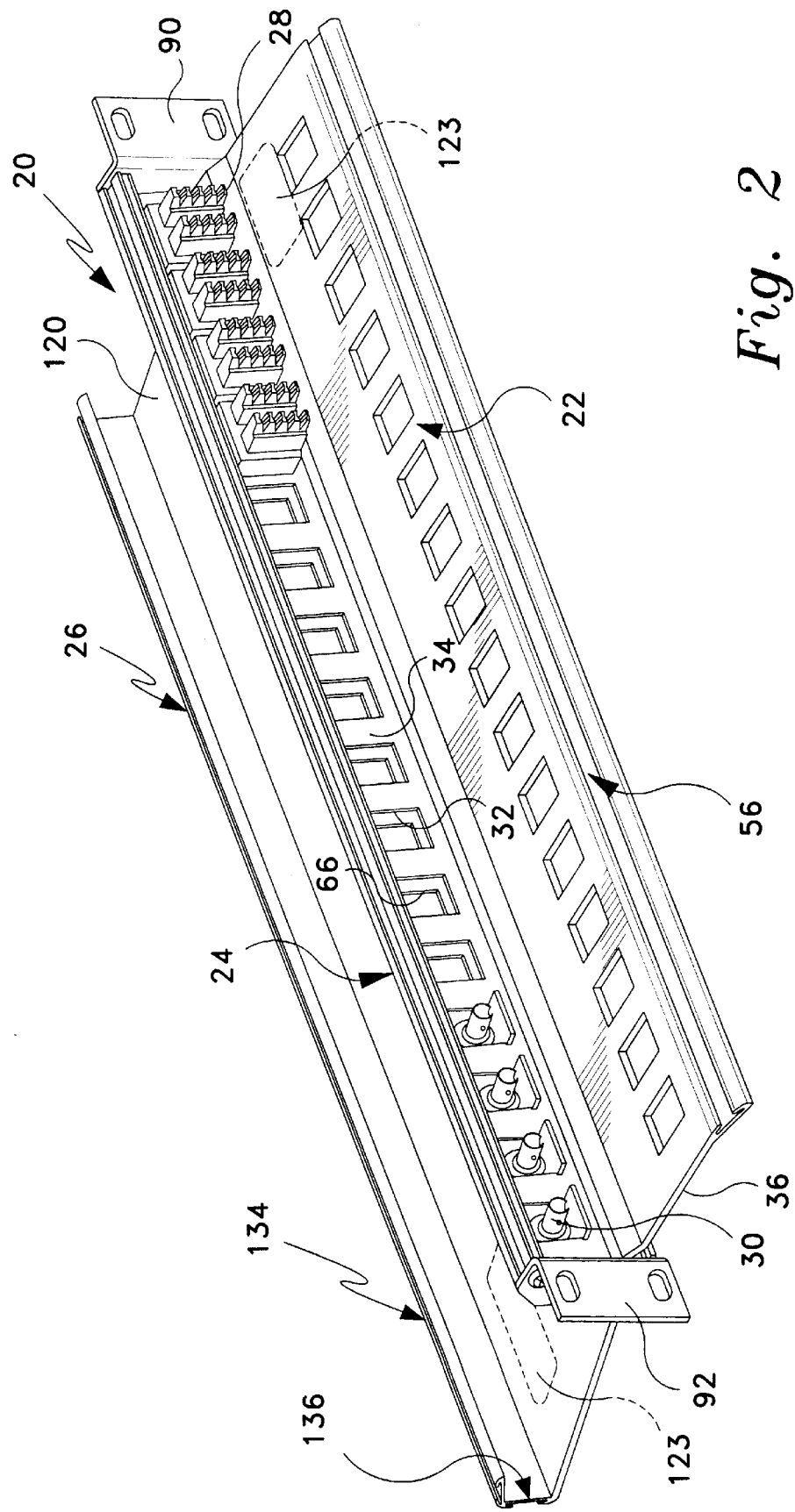
FIG. 2 is a generally rear perspective view of the patch panel of FIG. 1 with certain connectors mounted therein.
Figure 3:
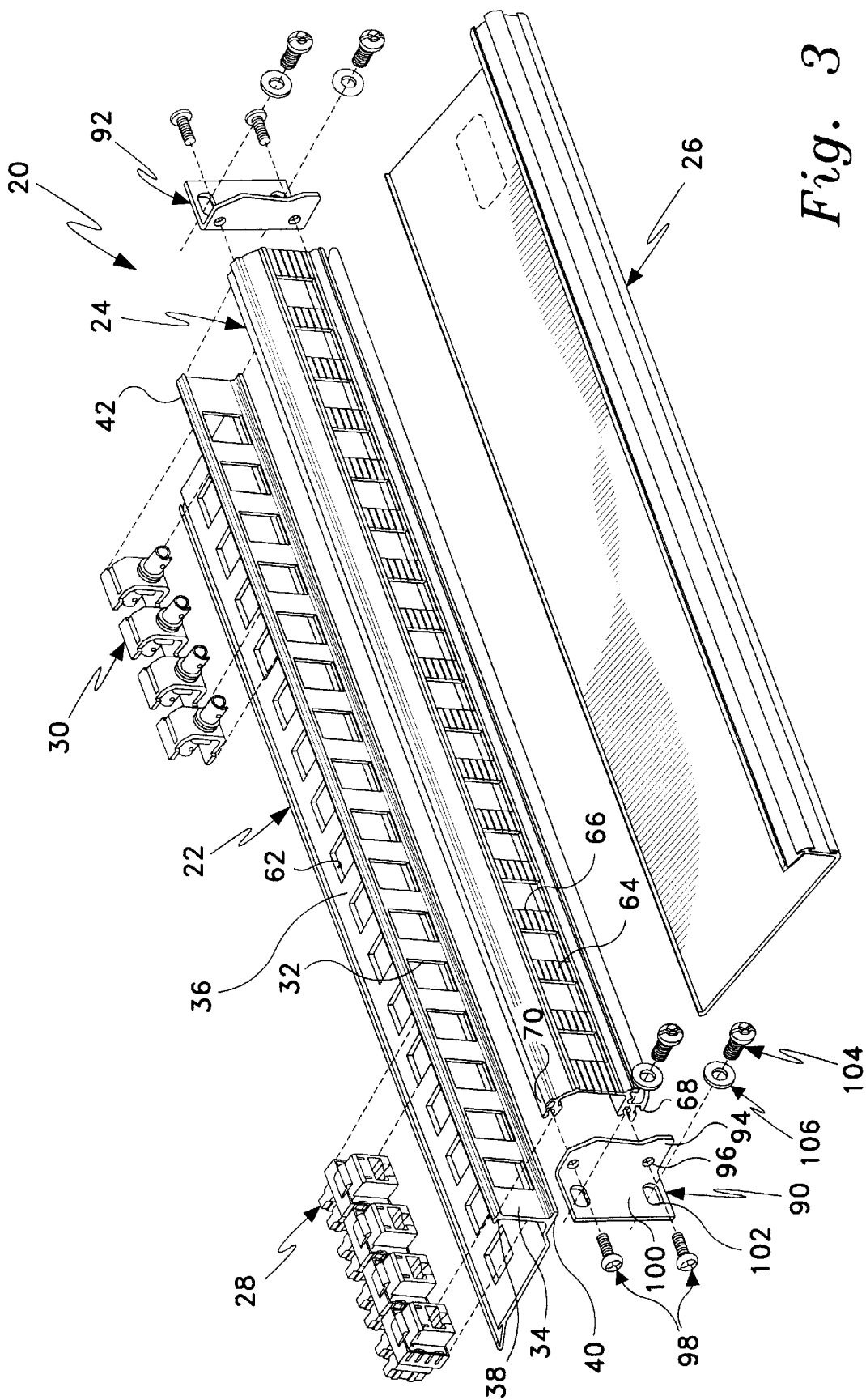
FIG. 3 is an exploded, generally front, perspective view, including certain connectors, of the patch panel of FIG. 1.

Cable tray attachment edge portion comprises an attachment flange 118 extending generally perpendicularly from base portion 120. Attachment flange 118 is selectively receivable in the first and second locking channels 114 and 116. When located in either of the channels, the lower surface 121 of the cable tray base portion rests on a rounded surface 122 on the front panel extending between its front surface and the interior of slot 108. When attachment flange 118 is located in first locking channel 114, the cable tray is in an upper or elevated position relative to the front panel openings 66. However, when the attachment flange is located in second locking channel 116, the cable tray will be angled downwardly to a lower position spaced at a greater distance from front panel openings 66 to provide greater access to the front of the connectors 28 and 30 extending through such openings. Labels 123 can be adhered to cable tray lower surface 121 and the lower surface of jack holder horizontal member 36 (FIG. 2).

Cable tray 26 is coupled to front panel 24 by axially sliding attachment edge portion 110 into slot 108 prior to installation of brackets 90 and 92. After the cable tray has been fully inserted and the brackets 90 and 92 are coupled to the front panel, the cable tray is securely retained in the front panel by the brackets.

To change the positioning of the cable tray from its normal position illustrated in FIG. 4 to a lower position for maintenance or service, the free or distal end 124 is pivoted upwardly about upper rounded surface 126, which defines the upper portion of the front panel entrance to slot 108. This upward pivoting of the free end removes attachment flange 118 from one of the locking channels for movement to the other locking channel. After the cable tray is moved radially relative to its pivot axis to the other locking channel, the free end can be pivoted downwardly by the appropriate mount permitted by the engagement of the attachment flange and the other locking channel.

For example, from the position illustrated in FIGS. 4 and 6, the cable tray free end is pivoted upwardly to disengage attachment flange 118 from locking channel 114. The cable tray is then slid in an radial direction until the attachment flange is aligned with second locking channel 116. At that time, the cable tray can be tilted downwardly to an extent significantly greater than that shown in FIG. 4. This additional downward pivoting is provided by locating locking channel 116 being closer to the entrance of slot 108 and by the greater depth of the locking channel 116. A reverse procedure would be used to return the cable tray to its upper position with the attachment flange 118 positioned in first locking channel 114.

Label support 128 extends from free edge 124. Label support comprises a vertical section 130 extending from free edge 124 substantially perpendicularly to base portion 120. A label receiving channel 132 extends at a angle at an end of vertical section 130 remote from base portion 120. Label receiving channel 132 is oriented to extend from vertical section 130 generally upwardly by and toward the vertical member of front panel 24, and has an undercut channel 134 on its upper surface which actually receives and contains the labels. Another label receiving channel 136 is formed as an undercut channel provided on the outer surface of vertical section 130 for receiving additional labeling. Further labeling can be provided on either the upper or lower surfaces of the base member 120. The labels in channels 134 and 136 will remain visible despite the wires or cables on the cable tray. Also the labeling on the bottom surface at the base member will remain exposed and can be viewed by the upward pivoting of the cable tray.

As best illustrated in FIG. 4, the connectors are oriented in an angled downward position toward cable tray 26. This facilitates the connections to the connectors by the decreasing the amount of cable bend necessary for making the connections.

FIGS. 8–10 illustrate a second embodiment of the patch panel according to the present invention. This second embodiment differs from the first embodiment by the use of an additional type of connector and by the connection of two front panels by the end brackets into a unit having two rows of connector openings and designed to receive two separate jack holders. The features parts of the second embodiment, which are constructed identically to that of the first embodiment, are denoted with the same reference numerals and are not discussed in detail relative to this embodiment. For those identical features or parts reference is made to the above corresponding discussion relative to the first embodiment. Thus, this description is limited to the differences.

Patch panel 200 according to the second embodiment comprises a front panels 202 and 203 for receiving first and second jack holders 204 and 206, respectively. Both jack holders are mounted in the respective front panel in a manner similar to the coupling between the front panel and the jack holder of the first embodiment. High density jacks 28, SF connectors 30 and SC connectors 208 are mounted and coupled to the jack holders. The connectors 28 and 30 are mounted in the manner described above for the first embodiment. The SC connectors are coupled by screws 210 extending through bores in the connectors and threaded into tapped bores in the jack holder.

Upper front panel 202 is provided with a upper pair forwardly extending engagement flanges 68 and 70 defining an upper channel therebetween. Lower front panel 203 has a lower pair of engagement flanges 68 and 70 defining a lower channel therebetween. These flanges and the channels defined thereby are essentially the same as those described above. Accordingly, a detailed description of the form of the two front panels and the two jack holders is not repeated.

The front panel are also provided with upper and lower slots 212 and 214 for receiving and mounting upper and lower cable trays 216 and 218. Since the forms of the slots and the cable trays are the same as that described above for the first embodiment, such description will not be repeated.

Brackets 220 and 222 are mounted on the opposite ends of front panel 202. Each bracket is L-shape and secured by screws 224 extending through one leg of the brackets and into bores 84 and 86 extending longitudinally through the upper and lower front panels. Screws 226 mounted in the other leg of each bracket secure patch panel 200 to a rack.

While various embodiments have been chosen to illustrate the invention, it will be understood by those skilled in the art that various changes and modifications can be made therein without departing from the scope of the invention as defined in the appended claims.

What is claimed is:

1. A patch panel for supporting a plurality of energy transmission connectors, comprising:

a first jack holder having a plurality of openings in which the connectors can be mounted and having a vertical member and a horizontal member extending at a angle to said vertical member, said vertical member having upper and lower engagement members extending from a surface of said vertical member remote from said horizontal member;

a first front panel having a vertical section with openings and with upper and lower, rearwardly extending engagement flanges defining a channel therebetween, said jack holder being mounted in said channel with said engagement members engaging said engagement flanges, said openings of said front panel being aligned with the respective openings in said jack holder; and a cable tray coupled to and extending forwardly from said vertical section of said front panel, said cable tray having a base portion.

2. A patch panel according to claim 1 wherein said cable tray base portion comprises an attachment edge adjacent to and coupled to said front panel and a free edge remote from said front panel; and a label support extends along said free edge.

3. A patch panel according to claim 2 wherein said label support comprises a vertical section extending from said free edge of said base portion and a label receiving channel extending angularly at an end of said vertical section remote from said base portion.

4. A patch panel according to claim 3 wherein said label receiving channel extends from said vertical section toward said vertical member of said front panel.

5. A patch panel according to claim 1 wherein said horizontal member of said jack holder comprises a label support at a free end thereof remote from said vertical member thereof.

6. A patch panel according to claim 5 wherein said label support comprises a label receiving channel extending at an angle to said jack holder horizontal member, said label receiving channel facing upwardly and outwardly.

7. A patch panel according to claim 1 wherein said cable tray is hinged to said front panel for pivoting about a horizontal axis.

8. A patch panel according to claim 7 wherein said front panel comprises a slot opening on a front surface of said front panel and receiving an attachment edge portion of said cable tray.

9. A patch panel according to claim 8 wherein said slot comprises a main channel and first and second locking channels located inside said slot and opening into said main channel at first and second distances from said front surface of said front panel, respectively; and said cable try comprises a base portion; and said attachment edge portion comprises an attachment flange extending angularly from said base portion and selectively receivable in said first and second locking channels to secure said cable tray in upper and lower positions relative to said openings of said front panel.

10. A patch panel according to claim 1 wherein said jack holder has jack retainers mounting individual connectors in said openings of said jack holder at angles such that front faces of said connectors slope downwardly toward said cable tray.

11. A patch panel according to claim 10 wherein each of said retainers comprise upper and lower abutments extending into the respective opening of said jack holder.

12. A patch panel according to claim 1 wherein mounting brackets are attached to opposite longitudinal ends of said front panel.

13. A patch panel according to claim 1 wherein said upper engagement flange comprises a downwardly opening recess with a groove opening forwardly into said recess; and said upper engagement member extending into said recess and has a rearwardly extending projection received in said groove.

14. A patch panel according to claim 13 wherein said lower engagement flange and said lower engagement member having mating detents with sloping surfaces.

15. A patch panel according to claim 1 wherein mounting brackets are attached to opposite longitudinal ends of said front panel, said brackets couple a second front panel to said first front panel;

said second front panel includes a vertical section with openings and with upper and lower rearwardly extending engagement flanges deferring a second channel therebetween; and a second jack holder includes a plurality of openings in which connectors can be mounted, a vertical member and a horizontal member extending at a angle to said vertical member, said vertical member of said second jack holder having upper and lower engagement members extending from a surface of said vertical member thereof remote from said horizontal member thereof, said second jack holder being mounted in said second channel with said engagement of said second jack holder members engaging said engagement flanges of said second front panel, said openings of said second front panel being aligned with the respective openings in said second jack holder.

16. A patch panel according to claim 15 wherein a second cable tray is coupled to and extends forwardly from said vertical section of said second front panel.

17. A patch panel for supporting a plurality of energy transmission connectors, comprising:

a first jack holder having a plurality of openings in which the connectors can be mounted and having a vertical member and a horizontal member extending at a angle to said vertical member, said vertical member having upper and lower engagement members extending from a surface of said vertical member remote from said horizontal member, said horizontal member of said jack holder including a first label support at a free end thereof remote from said vertical member thereof, said first label support including a first label receiving channel extending at an angle to said jack holder horizontal member, said first label receiving channel facing upwardly and outwardly;

a first front panel having a vertical section with openings and with upper and lower, rearwardly extending engagement flanges defining a channel therebetween, said jack holder being mounted in said channel with said engagement members engaging said engagement flanges, said openings of said front panel being aligned with the respective openings in said jack holder; and a cable tray hingedly coupled to and extending forwardly from said vertical section of said front panel, said cable tray having a base portion, said cable tray base portion having an attachment edge adjacent to and coupled to said front panel and a free edge remote from said front panel; and a second label support extending along said free edge of said base portion, said secure label support including a vertical section extending from said free edge of said base portion and a second label receiving channel extending angularlty at an end of said vertical section remote from said base portion, said second label receiving channel extending from said vertical section toward said vertical member of said front panel.

18. A patch panel according to claim 17 wherein said front panel comprises a slot opening on a front surface of said front panel and receiving an attachment edge portion of said cable tray.

19. A patch panel according to claim 18 wherein said slot comprises locking channels located inside said slot and opening into said main channel at first and second distances from said front surface of said front panel, respectively; and said attachment edge portion comprises an attachment flange extending angularly from said base portion and selectively receivable in said first and second locking channels to secure said cable tray in upper and lower positions relative to said openings of said front panel.

20. A patch panel according to claim 17 wherein said jack holder has jack retainers mounting individual connectors in said openings of said jack holder at angles such that front faces of said connectors slope downwardly toward said cable tray.

21. A patch panel according to claim 17 wherein said upper engagement flange comprises a downwardly opening recess with a groove opening forward into said recess; and said upper engagement member extends into said recess and has a rearwardly extending projection received in said groove.

* * * * *